United States Patent
Karabinis et al.

(10) Patent No.: US 7,933,552 B2
(45) Date of Patent: Apr. 26, 2011

(54) MULTI-BAND SATELLITE AND/OR ANCILLARY TERRESTRIAL COMPONENT RADIOTERMINAL COMMUNICATIONS SYSTEMS AND METHODS WITH COMBINING OPERATION

(75) Inventors: Peter Dimitrios Karabinis, Cary, NC (US); Rajendra Singh, Alexandria, VA (US)

(73) Assignee: ATC Technologies, LLC, Reston, VA (US)

( * ) Notice: Subject to any disclaimer, the term of this patent is extended or adjusted under 35 U.S.C. 154(b) by 1155 days.

(21) Appl. No.: 11/061,346

(22) Filed: Feb. 18, 2005

(65) Prior Publication Data
US 2005/0227618 A1 Oct. 13, 2005

Related U.S. Application Data

(60) Provisional application No. 60/555,283, filed on Mar. 22, 2004.

(51) Int. Cl.
*H04B 7/185* (2006.01)
(52) U.S. Cl. ...................... 455/12.1; 455/13.3
(58) Field of Classification Search .................. 455/12.1
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |

(Continued)

FOREIGN PATENT DOCUMENTS
EP 0 506 255 A2 9/1992
(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Duc Nguyen
*Assistant Examiner* — Ankur Jain
(74) *Attorney, Agent, or Firm* — Myers Bigel Sibley & Sajovec, P.A.

(57) ABSTRACT

A satellite radioterminal communications system may include first and second space-based components and a return link diversity combiner. The first space-based component may be configured to communicate uni-directionally and/or bidirectionally with a first radioterminal over a first forward link using a first band of frequencies and/or over a first return link using a second band of frequencies. The second space-based component may be configured to communicate uni-directionally and/or bidirectionally with a second radioterminal over a second forward link using a third band of frequencies and/or over a second return link using a fourth band of frequencies. The second space-based component may also be configured to receive return link communications from the first radioterminal over the first return link using the second band of frequencies, and the first and third bands of frequencies may be different bands of frequencies.

44 Claims, 4 Drawing Sheets

U.S. PATENT DOCUMENTS

| | | | |
|---|---|---|---|
| 5,619,525 | A | 4/1997 | Wiedeman et al. |
| 5,631,898 | A | 5/1997 | Dent |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,867,109 | A * | 2/1999 | Wiedeman .................. 455/13.1 |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,608,590 | B1 * | 8/2003 | Naym et al. .................. 342/359 |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman et al. |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 2002/0090942 | A1 | 7/2002 | Karabinis et al. |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054761 | A1 | 3/2003 | Karabinis |
| 2003/0054762 | A1 | 3/2003 | Karabinis |
| 2003/0054814 | A1 | 3/2003 | Karabinis et al. |
| 2003/0054815 | A1* | 3/2003 | Karabinis ..................... 455/427 |
| 2003/0068978 | A1 | 4/2003 | Karabinis et al. |
| 2003/0073436 | A1 | 4/2003 | Karabinis et al. |
| 2003/0149986 | A1 | 8/2003 | Mayfield et al. |
| 2003/0153308 | A1 | 8/2003 | Karabinis |
| 2003/0224785 | A1 | 12/2003 | Karabinis |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1* | 7/2004 | Churan ....................... 455/12.1 |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040659 | A1 | 2/2006 | Karabinis |

FOREIGN PATENT DOCUMENTS

| | | | |
|---|---|---|---|
| EP | 0 597 225 | A1 | 5/1994 |
| EP | 0 506 255 | B1 | 11/1996 |
| EP | 0 748 065 | | 12/1996 |
| EP | 0 748 065 | A2 | 12/1996 |
| EP | 0 755 163 | A2 | 1/1997 |
| EP | 0 762 669 | A2 | 3/1997 |
| EP | 0 762 669 | A3 | 3/1997 |
| EP | 0 797 319 | A2 | 9/1997 |
| EP | 0 831 599 | A2 | 3/1998 |
| EP | 0 831 599 | A3 | 3/1998 |
| EP | 1 059 826 | A1 | 12/2000 |
| EP | 1 130 799 | | 9/2001 |
| EP | 1 193 989 | A1 | 4/2002 |
| GB | 2 321 372 | | 7/1998 |
| WO | WO 01/54314 | | 7/2001 |
| WO | WO 01/54314 | A1 | 7/2001 |

OTHER PUBLICATIONS

Ayyagari et al., "A satellite-augmented cellular network concept", *Wireless Networks*, Vo. 4, 1998, pp. 189-198.

International Search Report and the Written Opinion of the International Searching Authority for International patent application No. PCT/US2005/008981 mailed on Aug. 26, 2005.

"Satellite Frequency Bands" 1 page <http://www.ictp.trieste.it/~radionet/2001_school/lectures/luther/HTML/develop/sld052.htm> Accessed online Jan. 17, 2005.

"www.sitcoms.org.uk: Radio & Satellite Frequency Bands" (copyright 2002-2005) <http://www.sitcoms.org.uk/frequencybands.asp> 2 pages Accessed online Jan. 17, 2005.

Attia et al. "Satellite Diversity Gain Over the LEOS Channel, Based CDMA Systems" 5 pages <http://www.ee.ucl.ac.uk/Ics/papers2000/Ics062.pdf>.

Eutelsat "Satellite Information > General Information: Frequency Bands" 1 page <http://www.eutelsat.com/satellites/4_2_7_2b.html> Accessed online Jan. 17, 2005.

Long "Frequencies for Satellite Communications" *Telesatellit* (Mar./Apr. 1997) 13 pages <http://mlesat.com/Article9.html> Accessed online Jan. 17, 2005.

Neuhaus "Satellite Frequency to L-Band Conversion" (Sep. 2002) 1 page <http://www.jneuhaus.com/fccindex/1_band.html> Accessed online Jan. 17, 2005.

Panagopoulos et al. "Satellite Communications at Ku, Ka, and V bands: Propagation Impairments and Mitigation Techniques" *IEEE Communications Surveys & Tutorials* (2004) 17 pages <http://www.comsoc.org/livepubs/surveys/public/2004/jul/Panagopoulos.html> Accessed online Jan. 17, 2005.

Tesi et al. "Space-Time Coded Satellite Diversity in S-UMTS" 8 pages <http://www.estec.esa.nl/conferences/01c14/papers/5.6.pdf>.

Wood et al. "Managing Diversity with Handover to Provide Classes of Service in Satellite Constellation Networks" 10 pages <http://www.ee.surrey.ac.uk/personal/l.wood/publications/wood-et-al-AIAA-diversity.pdf>.

Canadian Office Action (4 pages) corresponding to Japanese Patent Application No. 2,554,584; Mailing Date: Oct. 25, 2010.

* cited by examiner

MULTI-BAND SATELLITE AND/OR ANCILLARY TERRESTRIAL COMPONENT RADIOTERMINAL COMMUNICATIONS SYSTEMS AND METHODS WITH COMBINING OPERATION

RELATED APPLICATIONS

The present application claims priority from U.S. Provisional Application Ser. No. 60/555,283, entitled Multi-Band Satellite Radioterminal Communications Systems And Methods With Common Return Link Band, filed Mar. 22, 2004, and incorporated herein by reference in its entirety.

FIELD OF THE INVENTION

This invention relates to radioterminal communications systems and methods, and more particularly to terrestrial cellular and satellite cellular radioterminal communications systems and methods.

BACKGROUND OF THE INVENTION

Satellite communications systems and methods are widely used for wireless communications. Satellite communications systems and methods generally employ at least one space-based component, such as one or more satellites, that are configured to wirelessly communicate with a plurality of satellite radioterminals.

A satellite radioterminal communications system or method may utilize a single antenna beam pattern covering an entire area served by the system. Alternatively, in cellular satellite radioterminal communications systems and methods, multiple antenna beam patterns (cells) are provided, each of which can serve substantially distinct geographical areas in the overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," "terminal", or "wireless user device".

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

The capacity of a hybrid system, comprising terrestrial and satellite-based connectivity and configured to terrestrially reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used between satellite and terrestrial communications), which can lead to increased cost, size and/or weight of the radioterminal. See U.S. Pat. No. 6,052,560 to the present inventor Karabinis, entitled Satellite System Utilizing a Plurality of Air Interface Standards and Method Employing Same.

U.S. Pat. No. 6,684,057, to present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. Patent Application Publication No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY

According to embodiments of the present invention, a satellite radioterminal communications system may include first and second space-based components and a return link diversity combiner. The first space-based component may be configured to communicate uni-directionally and/or bidirectionally with a first radioterminal over a first forward link using a first band of frequencies and over a first return link using a second band of frequencies. The second space-based component may be configured to communicate uni-directionally and/or bidirectionally with a second radioterminal over a second forward link using a third band of frequencies and over a second return link using a fourth band of frequencies and to receive return link communications from the first radioterminal over the first return link using at least a portion of the second band of frequencies. Moreover, the first and third bands of frequencies may be different bands of frequencies. The return link diversity combiner may be configured to combine return link communications received from the first radioterminal at the first and second space-based components.

The first space-based component may be further configured to receive return link communications from the second radioterminal over the second return link using at least a portion of the fourth band of frequencies. Accordingly, a return link diversity combiner may be configured to combine return link communications that are received from the second radioterminal at the first and second space-based components.

The first and/or second space-based components may be further configured to receive return link communications from the first and/or second radioterminals over at least two substantially orthogonal polarizations. Accordingly, a return link combiner may be configured to combine return link communications that are received from the first radioterminal at the first and/or second space-based components over the at least two substantially orthogonal polarizations and the same or other return link combiner may be configured to combine return link communications that are received from the second radioterminal at the first and/or second space-based components over the at least two substantially orthogonal polarizations.

According to some embodiments, the second and fourth bands of frequencies may be different bands of frequencies. According to other embodiments, the first and second bands of frequencies may be substantially a same band of frequencies, and the third and fourth bands of frequencies may be substantially a same band of frequencies. According to still other embodiments, the second and fourth bands of frequencies may be substantially a same band of frequencies. Moreover, the second and fourth bands of frequencies may be substantially a same band of frequencies distinct from each of the first and third bands of frequencies, or the second and fourth bands of frequencies may be substantially a same band of frequencies that is a combination of the first and third bands of frequencies.

According to particular embodiments, the first band of frequencies may be a band of frequencies of an S frequency band and/or an L frequency band, and the third band of frequencies may be a band of frequencies of an S frequency band and/or an L frequency band. More generally, the first, second, third and/or fourth band of frequencies may be a band of frequencies of an L frequency band, an S frequency band, a C frequency band, an X frequency band, a Ku frequency band, a Ka frequency band, a V frequency band and/or any other frequency band.

The satellite radioterminal communications system may also include an ancillary terrestrial network comprising at least one ancillary terrestrial component that is configured to communicate with the first and/or second radioterminal over substantially the first, second, third and/or fourth bands of frequencies, over a portion of the first, second, third and/or fourth bands of frequencies and/or over at least one other frequency that is not substantially included in the first, second, third and/or fourth bands of frequencies. The ancillary terrestrial network comprising the at least one ancillary terrestrial component may be further configured to communicate with the first and/or second radioterminal over at least two substantially orthogonal polarizations and/or spaced apart antennas. In addition, the ancillary terrestrial network and the first and/or second space-based component may be further configured to hand-off a uni-directional and/or a bidirectional communication (such as a voice and/or data communication) between the first radioterminal and the first and/or second space-based component to the ancillary terrestrial network and a uni-directional and/or a bidirectional communication between the second radioterminal and the second and/or first space-based component may be handed-off to the ancillary terrestrial network. In addition, a uni-directional and/or a bidirectional communication (such as a voice and/or data communication) between the first radioterminal and the ancillary terrestrial network may be handed-off to the first and/or second space-based component and a uni-directional and/or a bidirectional communication between the second radioterminal and the ancillary terrestrial network may be handed-off to the second and/or first space-based component.

The first, second, third, and/or fourth bands of frequencies may be a band of frequencies consisting of frequencies of an L frequency band, an S frequency band, a C frequency band, an X frequency band, a Ku frequency band, a Ka frequency band, a V frequency band, and/or any other band. Moreover, the first space-based component may not transmit using the third band of frequencies, and the second space-based component may not transmit using the first band of frequencies.

According to additional embodiments of the present invention, a method of operating a satellite radioterminal communications system may include providing uni-directional and/or bidirectional communication between a first space-based component and a first radioterminal over a first forward link using a first band of frequencies and/or over a first return link using a second band of frequencies. Uni-directional and/or bidirectional communication may also be provided between a second space-based component and a second radioterminal over a second forward link using a third band of frequencies and/or over a second return link using a fourth band of frequencies and the first and third bands of frequencies may be different bands of frequencies. Return link communications may be received at the second space-based component from the first radioterminal over the first return link using the second band of frequencies, and return link communications received from the first radioterminal at the first and second space-based components may be diversity combined.

In addition, return link communications may be received at the first space-based component from the second radioterminal over the second return link using at least a portion of the fourth band of frequencies. Moreover, return link communications received from the second radioterminal at the first and second space-based components may be combined.

In some embodiments, the second and fourth bands of frequencies may be different bands of frequencies. In some other embodiments, the first and second bands of frequencies may be substantially a same band of frequencies, and the third and fourth bands of frequencies may be substantially a same band of frequencies. In still other embodiments, the second and fourth bands of frequencies may be substantially a same band of frequencies. More particularly, the second and fourth bands of frequencies may be substantially a same band of frequencies distinct from each of the first and third bands of frequencies, or the second and fourth bands of frequencies may be substantially a same band of frequencies that is a combination of the first and third bands of frequencies.

According to particular embodiments, the first, second, third and/or fourth bands of frequencies may be a band of frequencies of an S frequency band and/or an L frequency band. More generally, the first, second, third and/or fourth bands of frequencies may be a band of frequencies of an L frequency band, an S frequency band, a C frequency band, an X frequency band, a Ku frequency band, a Ka frequency band, a V frequency band and/or any other frequency band.

In addition, communication may be provided between an ancillary terrestrial network comprising at least one ancillary terrestrial component and the first and/or second radioterminal over substantially the first, second, third and/or fourth bands of frequencies, over a portion of the first, second, third and/or fourth bands of frequencies and/or over at least one other frequency that is not substantially contained in the first, second, third and/or fourth band of frequencies. A unidirectional and/or a bidirectional communication (such as a voice and/or data communication) between the first radioterminal and the first and/or second space-based component may thus be handed-off to the ancillary terrestrial network and a uni-directional and/or a bidirectional communication between the second radioterminal and the second and/or first space-based component may be handed-off to the ancillary terrestrial component. In addition, a uni-directional and/or a bidirectional communication (such as a voice and/or data communication) between the first radioterminal and the ancillary terrestrial network may be handed-off to the first and/or second space-based component and a uni-directional and/or a bidirectional communication between the second radioterminal and the ancillary terrestrial network may be handed-off to the second and/or first space-based component.

The first, second, third and/or fourth bands of frequencies may be a band of frequencies consisting of frequencies of an L frequency band, an S frequency band, a C frequency band, an X frequency band, a Ku frequency band, a Ka frequency band, a V frequency band and/or any other frequency band. In addition, the first space-based component may not transmit using the third band of frequencies, and the second space-based component may not transmit using the first band of frequencies.

According to still additional embodiments of the present invention, a satellite radioterminal communications system may include first and second space-based components, a return link diversity combiner, and an ancillary terrestrial network. The first space-based component may be configured to communicate uni-directionally and/or bidirectionally with a first radioterminal over forward and/or return links using a first band of frequencies and to receive return link communications from a second radioterminal using at least a portion of a second band of frequencies. The second space-based component may be configured to communicate uni-directionally and/or bidirectionally with a second radioterminal over forward and/or return links using the second band of frequencies and to receive return link communications from the first radioterminal using at least a portion of the first band of frequencies. One or more return link diversity combiners may be configured to combine return link communications that are received from the first radioterminal at the first and second space-based components and to combine return link communications that are received from the second radioterminal at the first and second space-based components. The ancillary terrestrial network may be configured to communicate with the first and/or second radioterminal over substantially the first and/or second band of frequencies, over a portion of the first and/or second bands of frequencies and/or over at least one other frequency that is not substantially included in the first and/or second band of frequencies.

The first and second bands of frequencies may be different bands of frequencies, and the first and second bands of frequencies may be distinct or partially overlapping. According to particular embodiments, the first band of frequencies may be a band of frequencies of an S frequency band and/or an L frequency band, and the second band of frequencies may be a band of frequencies of an S frequency band and/or an L frequency band. More generally, the first and/or second bands of frequencies may be a band of frequencies of an L frequency band, an S frequency band, a C frequency band, an X frequency band, a Ku frequency band, a Ka frequency band, a V frequency band and/or any other frequency band.

The ancillary terrestrial network and the first and/or second space-based component may be further configured to hand-off a uni-directional and/or a bidirectional communication (such as a voice and/or data communication) between the first radioterminal and the first and/or second space-based component to the ancillary terrestrial network and a uni-directional and/or a bidirectional communication between the second radioterminal and the second and/or first space-based component may be handed-off to the ancillary terrestrial component. In addition, a unidirectional and/or a bidirectional communication (such as a voice and/or data communication) between the first radioterminal and the ancillary terrestrial network may be handed-off to the first and/or second space-based component and a uni-directional and/or a bidirectional communication between the second radioterminal and the ancillary terrestrial network may be handed-off to the second and/or first space-based component. Moreover, the first space-based component may not transmit using the second band of frequencies, and the second space-based component may not transmit using the first band of frequencies.

According to yet additional embodiments of the present invention, a method of operating a satellite radioterminal communications system may include providing uni-directional and/or bidirectional communications between a first space-based component and a first radioterminal over forward and/or return links using a first band of frequencies. Return link communications may be received from a second radioterminal at the first space-based component using at least a portion of a second band of frequencies. In addition, uni-directional and/or bidirectional communication may be provided between a second space-based component and a second radioterminal over forward and/or return links using the second band of frequencies, and return link communications may be received from the first radioterminal at the second space-based component using at least a portion of the first band of frequencies. Return link communications that are received from the first radioterminal at the first and second space-based components may be combined, and return link communications that are received from the second radioterminal at the first and second space-based components may be combined. In addition, communications may be provided between the first and/or second radioterminal and an ancillary terrestrial network over substantially the first and/or second band of frequencies, over a portion of the first and/or second band of frequencies and/or over at least one other frequency that is not substantially included in the first and/or second band of frequencies.

The first and second bands of frequencies may be different bands of frequencies, and the first and second bands of frequencies may be distinct or partially overlapping. According to particular embodiments, the first and/or second bands of frequencies may be a band of frequencies of an S frequency band and/or an L frequency band. More generally, the first, second, third and/or fourth band of frequencies may be a band of frequencies of an L frequency band, an S frequency band, a C frequency band, an X frequency band, a Ku frequency band, a Ka frequency band, a V frequency band and/or any other frequency band.

In addition, a uni-directional and/or bidirectional communication (such as a voice and/or data communication) between the first radioterminal and the first and/or second space-based component may be handed-off to the ancillary terrestrial network and a uni-directional and/or a bidirectional communication between the second radioterminal and the second and/or first space-based component may be handed-off to the ancillary terrestrial component. In addition, a uni-directional and/or a bidirectional communication (such as a voice and/or data communication) between the first radioterminal and the ancillary terrestrial network may be handed-off to the first and/or second space-based component and a uni-directional and/or a bidirectional communication between the second radioterminal and the ancillary terrestrial network may be handed-off to the second and/or first space-based component. Moreover, the first space-based component may not transmit using the second band of frequencies, and the second space-based component may not transmit using the first band of frequencies.

According to more embodiments of the present invention, a wireless communications system may include at least one space-based network, at least one ancillary terrestrial network, and at least one plurality of radioterminals. The at least one space-based network may include at least one space-based component, and the at least one ancillary terrestrial network may include at least one plurality of ancillary terrestrial components. Moreover, the at least one plurality of radioterminals may be operative to communicate with the at least one space-based network and the at least one ancillary terrestrial network using a frequency band. In addition, at least one radioterminal of the at least one plurality of radioterminals and the at least one plurality of ancillary terrestrial components may be operatively configured to preferentially establish communications thereinbetween.

According to still more embodiments of the present invention, methods may be provided for operating a wireless communications system including at least one space-based network having at least one space-based component and at least one ancillary terrestrial network having at least one plurality of ancillary terrestrial components. More particularly, communications may be preferentially established between a radioterminal and at least one ancillary terrestrial component of the ancillary terrestrial network. Moreover, the radioterminal may be operative to communicate with both the at least one space-based network and the at least one ancillary terrestrial network using a frequency band.

DETAILED DESCRIPTION

Figure 1:
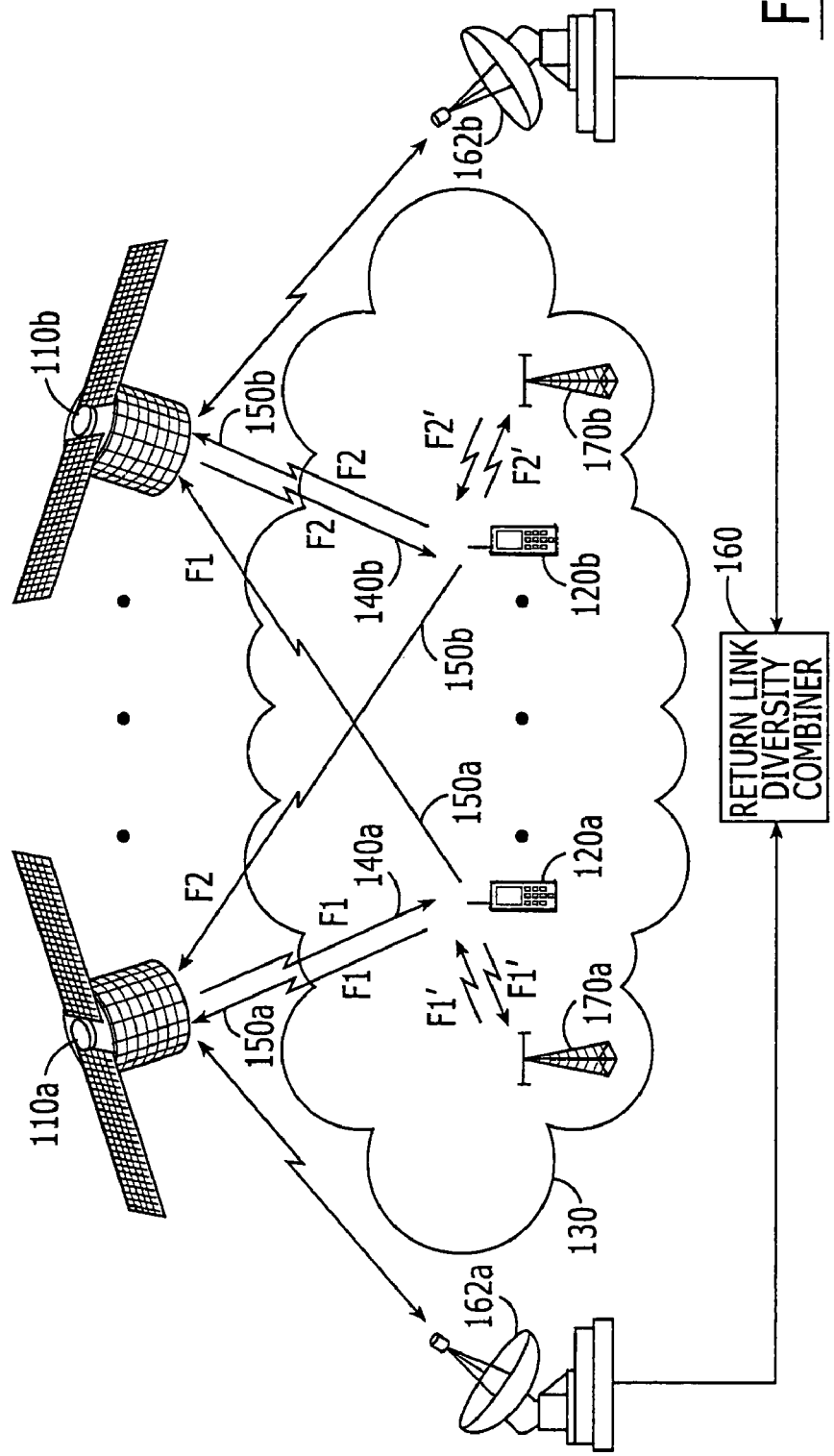
FIG. 1 is a schematic diagram of multi-band radioterminal communications systems and methods according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first, second, third and fourth are used herein to describe various elements, these elements should not be limited by these terms. These terms are only used to distinguish one element from another element. Thus, a first element below could be termed a second, third or fourth element, and similarly, a second element may be termed a first, third or fourth element etc., without departing from the teachings of the present invention. As used herein, the term "and/or" includes any and all combinations of one or more of the associated listed items. The symbol "/" is also used as a shorthand notation for "and/or". Moreover, as used herein, "substantially the same" band means that the bands substantially overlap, but that there may be some areas of non-overlap, for example at a band end. Moreover, "substantially the same" air interface means that the air interfaces are similar but need not be identical. Some changes may be made to the air interface to account for different characteristics of the terrestrial and satellite environments. For example, respective different vocoder rates may be used for satellite communications and for terrestrial communications (for example, 13 kbps for terrestrial communications and 4 kbps for satellite communications). In addition, a different forward error correction coding, a different interleaving depth, and/or different spread spectrum codes (e.g. Walsh codes, long codes, and/or frequency hopping codes) may be used for satellite communications compared to respective parameters used for terrestrial communications. Moreover, "substantially the same" bands of frequencies means that the bands of frequencies being compared contain a common set of frequencies but some frequencies contained in at least one of the bands may be different (non-common). In general, "X and Y are substantially the same" means that X and Y have/share a plurality of identical and/or similar parameters and/or characteristics but X and Y may differ in at least one parameter and/or characteristic.

It will be understood that when an element is referred to as being "connected" or "coupled" to another element, it can be directly connected or coupled to the other element or intervening elements may be present. Furthermore, "connected" or "coupled" as used herein may include wirelessly connected or coupled. The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Multi-band/multi-mode satellite radioterminal communications systems and methods according to some embodiments of the present invention may be used when a satellite footprint or service area spans a geographic area in which two or more terrestrial radioterminal systems (terrestrial wireless network operators) may be present, to add spaced-based communications capability to two or more terrestrial wireless networks. Within a geographic area that is covered by a given terrestrial wireless system, embodiments of the invention can provide additional capacity and/or extended services using a space-based component and/or an ancillary terrestrial network, using substantially the same and/or different band segment and/or substantially the same and/or different air interface as the terrestrial radiotelephone system. Thus, different and/or overlapping geographic regions corresponding to different wireless radioterminal communications systems and methods according to embodiments of the invention may use different band segments of a satellite frequency band, such as an L-band, and may use different air interfaces for compatibility with the terrestrial wireless systems that are located within the different geographic areas. There also may be other scenarios wherein it may be desired for a single satellite radioterminal communications system/method to employ different band segments, and potentially different air interfaces over the same and/or different geographic regions thereof.

Some embodiments of the present invention provide satellite radioterminal communications systems and methods wherein at least two space-based components, such as two satellites, are configured to communicate with radioterminals. A first space-based component is configured to communicate uni-directionally and/or bidirectionally with a first radioterminal over forward and/or return links using a first band of frequencies. A second space-based component is configured to communicate uni-directionally and/or bidirectionally with a second radioterminal over forward and/or return links using a second band of frequencies. The first space-based component is also configured to receive return link communications from the second radioterminal over at least a portion of the second band of frequencies, but is not configured to transmit forward link communications to the second radioterminal over the second band of frequencies.

Similarly, the second space-based component is configured to receive return link communications from the first radioterminal over at least a portion of the first band of frequencies, but is not configured to transmit forward link communications to the first radioterminal over the first band of frequencies. In some embodiments, the first space-based component may also be configured to transmit forward link communications to the second radioterminal over at least a portion of the second band of frequencies and the second space-based component may be configured to transmit forward link communications to the first radioterminal over at least a portion of the first band of frequencies.

A return link diversity combiner may also be provided that is configured to combine return link communications that are received from the first radioterminal at the first and second space-based components, and/or to combine return link communications that are received from the second radioterminal at the first and second space-based components, to thereby allow an increase in a return link margin and/or allow an advantageous change in at least one return link performance measure such as a Bit Error Rate (BER) performance measure. In some embodiments, at least one of the space-based components may also be configured to receive from a radioterminal using at least two substantially orthogonal polarizations and the return link diversity combiner may be further configured to combine return link communications that are received over the at least two substantially orthogonal polarizations from the first radioterminal at the first and/or second space-based components, and/or to combine return link communications that are received over the at least two substantially orthogonal polarizations from the second radioterminal at the first and/or second space-based components, to thereby allow an improvement in at least one return link performance index. One or more ancillary terrestrial networks also may be provided that are configured to communicate with the first and/or second radioterminal over substantially the first and/or second band of frequencies. In some embodiments, at least one base station of at least one ancillary terrestrial network may be configured to receive from the first and/or second radioterminals using at least two substantially orthogonal polarizations and/or spaced apart antennas to thereby provide an improvement of at least one return link performance measure/index such as a link margin and/or a BER.

Accordingly, some embodiments of the present invention can allow space-based components to transmit forward link communications to radioterminals over distinct bands of frequencies, such as over an L band of frequencies and/or an S band of frequencies and to receive communications from radioterminals over distinct bands of frequencies, such as over an L band of frequencies and/or an S band of frequencies. Single mode/single band and/or dual mode/dual band transmission may thereby be provided at each space-based component, while allowing multi-mode/multi band reception for diversity combining.

Thus, some embodiments of the present invention can allow two satellites to use different bands of forward link frequencies to communicate with radioterminals, while allowing the two satellites to use a common band of return link frequencies to communicate with radioterminals. By allowing a given satellite to provide only a single band of forward link frequencies, a potential increase in power consumption, weight, complexity and/or other undesirable effects that may arise from a satellite transmitting in multiple frequency bands may be reduced or eliminated. Yet, by allowing multiple satellites to use a common band of return link frequencies, potential advantages of return link diversity reception may be obtained, including providing higher return link margins. Reduced transmit power thereby may be used by the radioterminals, to allow increased battery life. Moreover, the reduced transmit power may reduce radiation by the radioterminals, which may potentially interfere with other systems.

FIG. 1 is a schematic diagram of multi-band satellite radioterminal communications systems and methods according to some embodiments of the present invention. As shown in FIG. 1, these embodiments of satellite radioterminal communications systems and methods include at least two space-based components 110a, 110b that are configured to communicate with radioterminals 120a, 120b in a satellite footprint 130. It will be understood by those having skill in the art that the satellite footprint 130 for the first and second space-based components 110a, 110b may be common as shown in FIG. 1, or non-common and/or partially overlapping. Moreover, although only two space-based components and two radioterminals are illustrated, larger numbers may be provided in embodiments of the present invention.

Still referring to FIG. 1, the first space-based component 110a is configured to transmit downlink or forward link communications 140a to the first radioterminal 120a over at least some frequencies of a first band of frequencies, designated in FIG. 1 by "F1". In some embodiments, the first band of frequencies may be frequencies of a conventional satellite L band. As also shown in FIG. 1, the first radioterminal 120a is also configured to transmit uplink or return link communications 150a to the first satellite 110a over at least some frequencies of the first band of frequencies F1.

Still referring to FIG. 1, the second space-based component 110b is configured to transmit downlink communications 140b to the second radioterminal 120b using at least some frequencies of a second band of frequencies designated as "F2" which may, for example, be frequencies of a conventional satellite S band. The second radioterminal 120b is also configured to transmit uplink communications 150b to the second space-based component 110b using at least some frequencies of the second band of frequencies F2. Thus, the first radioterminal 120a is configured to uni-directionally and/or bidirectionally communicate with the first space-based component 110a using the first band of frequencies F1, and the second radioterminal 120b is configured to uni-directionally and/or bidirectionally communicate with the second space-based component 110b using the second band of frequencies F2.

Still referring to FIG. 1, the first space-based component 110a is also configured to receive the return link communications 150b from the second radioterminal 120b over the second band of frequencies F2. Moreover, the second space-based component 110b is also configured to receive the return link communications 150a from the first radioterminal 120a over the first band of frequencies F1. Thus, viewed from the perspective of a given space-based component 110a or 110b, a single band of downlink frequencies may be used (at least some frequencies of F1 for space-based component 110a and/or at least some frequencies of F2 for space-based component 110b). However, for uplink reception, a common band of frequencies (at least some frequencies of F1 and at least some frequencies of F2) may be received by either of the space-based components 110a, 110b.

For a given space-based component, downlink transmissions may therefore use a single band of frequencies, to thereby reduce potentially undesired satellite overhead that may be used in transmitting multiple bands of frequencies. Moreover, a given space-based component may be configured to receive common return link frequencies, to thereby allow return link diversity combining using, for example, a return link diversity combiner 160. Return link diversity combining may allow an improved performance margin to be provided in a return link, thereby allowing reduced power, weight, radiation and/or other demands on radioterminals 120. It will be understood by those having skill in the art that the return link diversity combiner 160 may be associated with and/or configured at a first satellite gateway 162a that is associated with the first space-based component 110a, a second satellite gateway 162b that is associated with a second space-based component 110b, both satellite gateways 162a, 162b, and/or at least partially separate from either gateway. Moreover, portions of the return link diversity combiner 160 may be distributed and/or configured among different elements of embodiments illustrated in FIG. 1.

In some embodiments of the present invention, the band-sensitive (i.e., frequency-sensitive) components of the space-based components 110a, 110b, such as, for example, an antenna feed network, a low noise amplifier, etc., for the return link(s) may be designed to be broadband, so that the operational range of the space-based component return link(s) can extend over a plurality of return link frequency bands, such as an L-band and/or an S-band, etc. In other embodiments, separate components for each band of frequencies may be provided. In still other embodiments, some common broadband components and some separate narrowband components may be provided. Narrowband components may be used for the forward links to potentially reduce overhead as was described above.

Still referring to FIG. 1, at least one of the space-based components 110a, 110b, may be configured to receive communications from radioterminals 120a, 120b, over at least two substantially orthogonal polarizations by configuring at least some of the receive antenna elements of the at least one of the space-based components to substantially receive in the at least two substantially orthogonal polarizations, and the return link diversity combiner 160 may also be configured to combine signals that are received by the at least one of the space-based components over the at least two substantially orthogonal polarizations to thereby further improve a return link performance measure such as, for example, a received signal strength, a BER and/or a link margin.

Referring again to FIG. 1, one or more ancillary terrestrial networks (ATNs) also may be provided, which may include respective pluralities of ancillary terrestrial components (ATCs). FIG. 1 illustrates two ATNs with respective ATCs 170a, 170b (only one ATC per ATN is illustrated in FIG. 1 for clarity). As shown in FIG. 1, a first ancillary terrestrial component 170a corresponding to a first ATN and the first radioterminal 120a may be configured to communicate uni-directionally and/or bidirectionally using substantially the first band of frequencies, denoted by F1' and/or substantially the second band of frequencies (not illustrated in FIG. 1) denoted by F2'. The first ancillary terrestrial component 170a and the second radioterminal 120b may also be configured to communicate uni-directionally and/or bidirectionally (not illustrated in FIG. 1) using substantially the second band of frequencies, denoted by F2' and/or substantially the first band of frequencies. The first ancillary terrestrial component 170a and radioterminal 120a and/or 120b may further be configured to communicate uni-directionally and/or bidirectionally using at least one other frequency that is not substantially contained in the band of frequencies F1, F2, F2' and/or F1'. The ancillary terrestrial component 170a may also be configured to receive information from radioterminal 120a and/or 120b using at least two substantially orthogonally-polarized, differently polarized and/or spaced-apart antennas to thereby improve a return link performance measure. A second ancillary terrestrial component 170b corresponding to a second ATN and the second radioterminal 120b may be configured to communicate uni-directionally and/or bidirectionally using substantially the second band of frequencies, denoted in FIG. 1 by F2' and/or substantially the first band of frequencies (not illustrated in FIG. 1). The second ancillary terrestrial component 170b and the first radioterminal 120a may also be configured to communicate uni-directionally and/or bidirectionally (not illustrated in FIG. 1) using substantially the first and/or second band of frequencies. The second ancillary terrestrial component 170b and radioterminal 120b and/or 120a may further be configured to communicate uni-directionally and/or bidirectionally using at least one other frequency that is not substantially contained in the band of frequencies F1, F2, F2' and/or F1'. The ancillary terrestrial component 170b may also be configured to receive information from radioterminal 120b and/or 120a using at least two substantially orthogonally-polarized, differently polarized and/or spaced-apart antennas to thereby improve a return link performance measure. Substantially the same air interfaces or different air interfaces may be used to communicate uni-directionally and/or bidirectionally over at least one space-based component and an ATC/ATN. It will be understood that although two ATNs (with each containing one ATC) are illustrated in FIG. 1 (for the sake of clarity), larger numbers of ATNs and/or ATCs may be provided according to embodiments of the present invention. It will also be understood that ATC 170a and/or 170b and radioterminal 120a and/or 120b may also be configured to communicate uni-directionally and/or bidirectionally therein between using at least some frequencies of a PCS and/or cellular (US and/or non-US) frequency band and/or any other frequency band.

Figure 2:
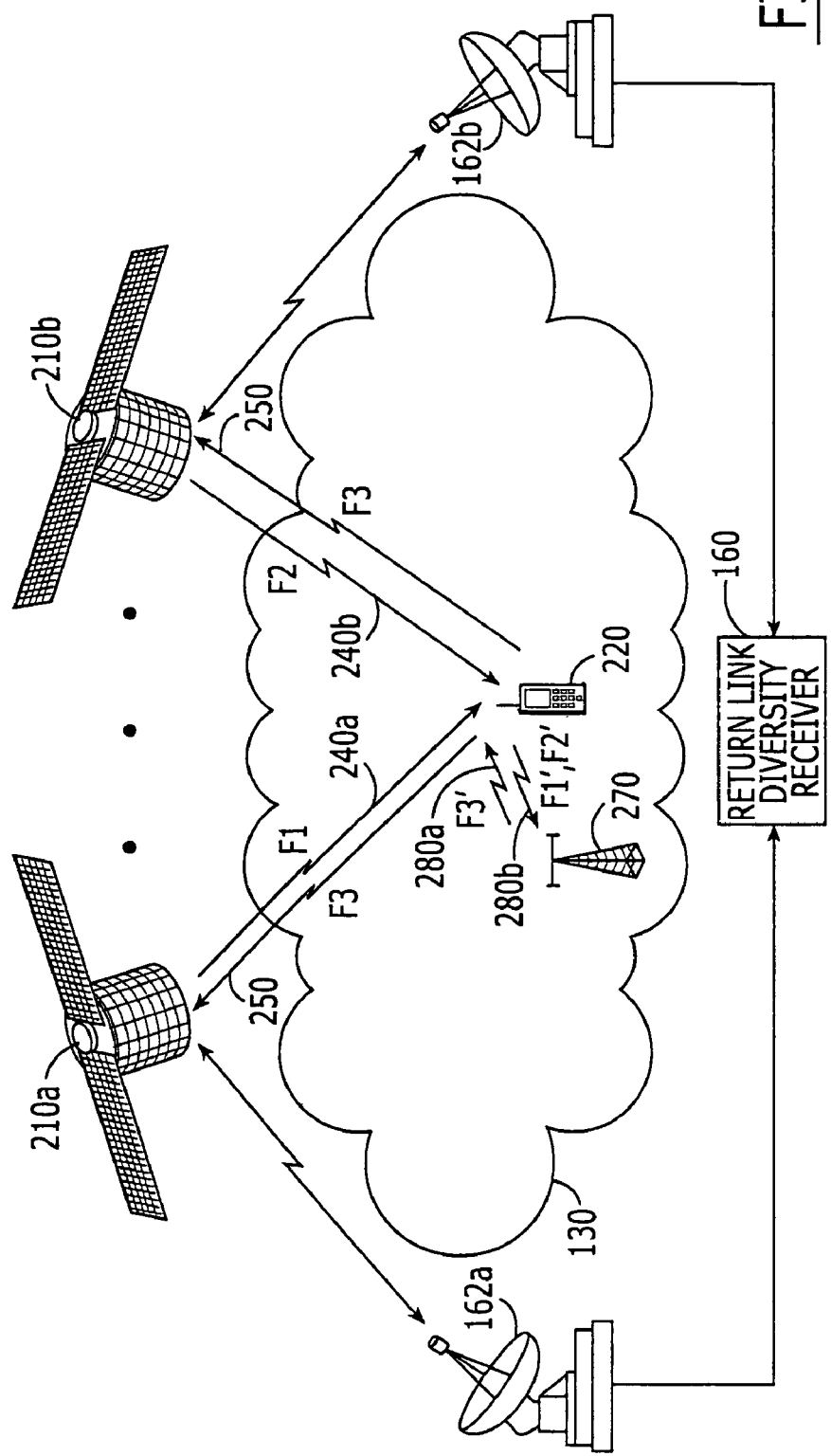
FIG. 2 is a schematic diagram of multi-band radioterminal communications systems and methods according to other embodiments of the present invention.

FIG. 2 is a schematic diagram of other embodiments of the present invention. In these embodiments, the first space-based component 210a transmits downlink communications 240a to a radioterminal 220 using a first band of frequencies F1, and/or receives uplink communications from the radioterminal 220 over a common band of frequencies F3. The second space-based component 210b transmits downlink communications 240b to the radioterminal 220 using a second band of frequencies F2 and/or receives return link communications from the radioterminal 220 over the common band of frequencies F3. In some embodiments, F3 may be distinct from F1 or F2. In other embodiments, F3 may partially overlap F1 and/or F2. In still other embodiments, F3 may be a combination of F1 and F2. An ancillary terrestrial network including one or more ancillary terrestrial components 270 also may communicate terrestrially with the radioterminal 220 over a forward terrestrial link 280a, using substantially the common band of frequencies F3' and/or over a return terrestrial link 280b using substantially the first and/or second band of frequencies F1', F2'.

Thus, in embodiments of FIG. 2, each space-based component 210a, 210b may use a single set of forward link frequencies F1, F2, respectively, but may receive communications over a common set of return link frequencies F3. In some embodiments of the invention, the band of frequencies F1 may be an S band of frequencies, the band of frequencies F2 may be an L band of frequencies, and the band of frequencies F3 may be a combination of an S band of frequencies and an L band of frequencies.

Figure 3:
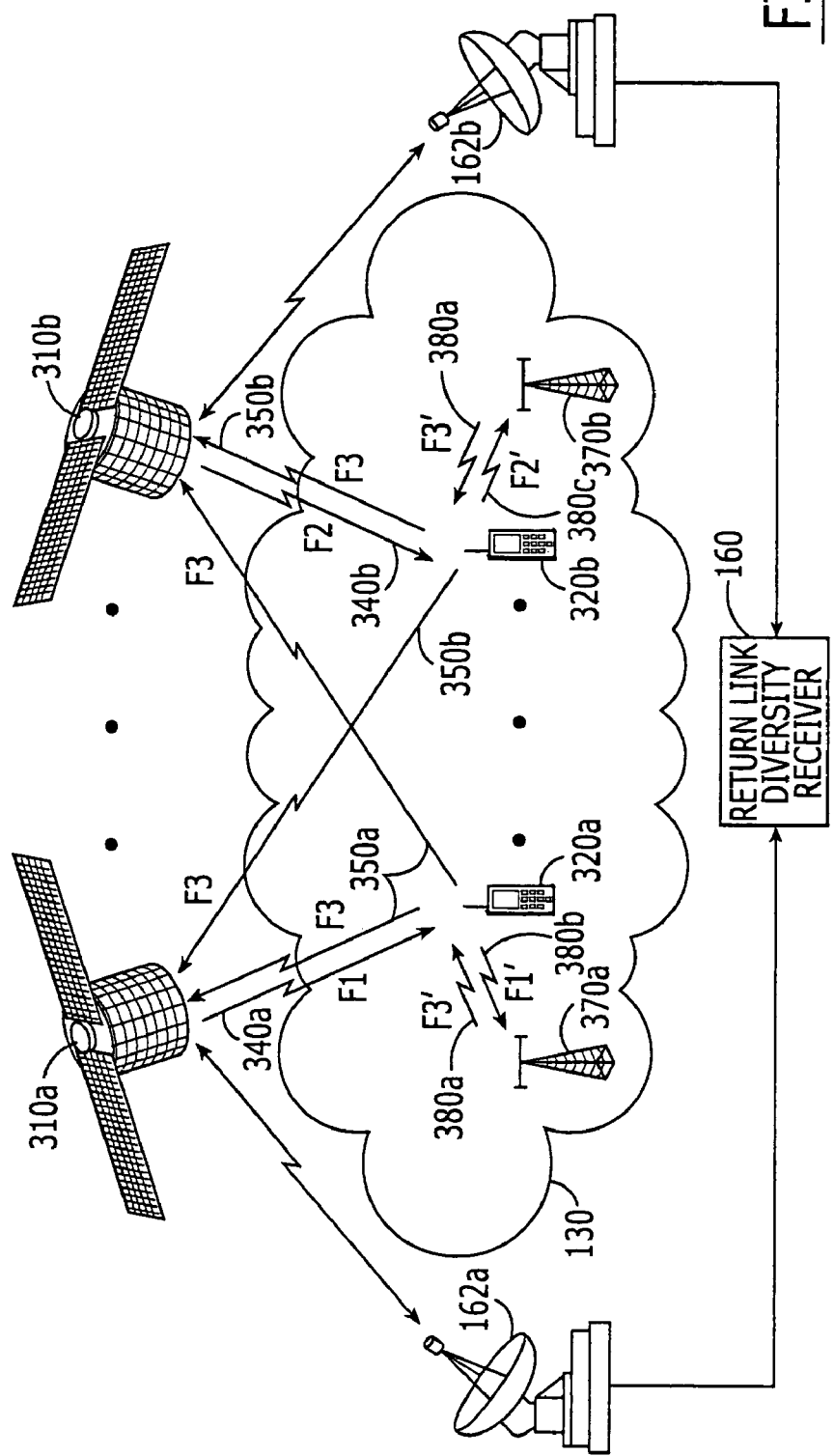
FIG. 3 is a schematic diagram of multi-band radioterminal communications systems and methods according to still other embodiments of the present invention.

FIG. 3 is a schematic diagram of still other embodiments of the present invention. In these embodiments, a first space-based component 310a is configured to transmit radioterminal communications to a first radioterminal 320a over a forward link 340a using a first band of frequencies F1. A second space-based component 310b is configured to transmit communications to a second radioterminal 320b over a second forward link 340b using a second band of frequencies F2. The first radioterminal 320a is configured to transmit return link communications 350a to both the first and second space-based components 310a, 310b using a common set of return link frequencies F3. The second radioterminal 320b is also configured to transmit return link communications 350b to both the first and second space-based components 310a, 310b using the common set of return link frequencies F3.

Thus, each space-based component can transmit using a single band of frequencies (F1 for space-based component 310a and F2 for space-based component 310b), to thereby reduce power, weight, complexity, etc., but can receive or listen over a common set of frequencies F3, to allow return link diversity processing. An ancillary terrestrial network also may be provided including a first ancillary terrestrial component 370a that is configured to transmit forward link communications 380a to the first radioterminal using substantially the common band of frequencies F3', and to receive return link communications 380b from the first radioterminal 320a using substantially the first band of frequencies F1'. Similarly, a second ancillary terrestrial component 370b may be configured to transmit forward link communications 380a to the second radioterminal 320b using substantially the common band of frequencies F3' and to receive return link transmissions 380c from the second radioterminal 320b using substantially the second band of frequencies F2'.

Figure 4:
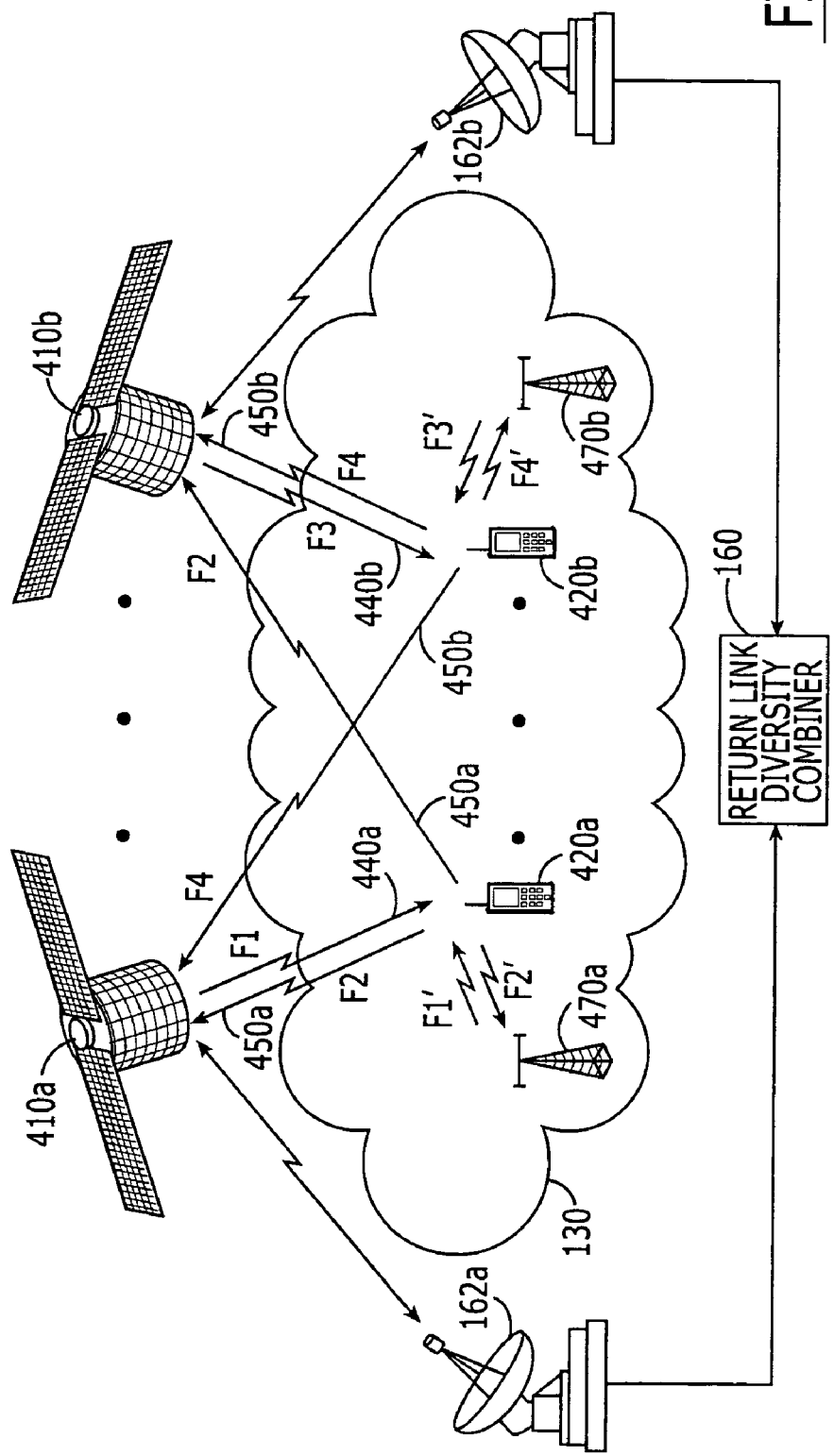
FIG. 4 is a schematic diagram of multi-band radioterminal communications systems and methods according to yet other embodiments of the present invention.

FIG. 4 is a schematic diagram of yet other embodiments of the present invention. As shown in FIG. 4, satellite radioterminal communications systems according to embodiments of the present invention may include at least two space-based components 410a, 410b that are configured to communicate with radioterminals 420a, 420b in a satellite footprint 130. It will be understood by those having skill in the art that satellite footprints for the respective space-based components 410a, 410b may be common (i.e. substantially overlapping), as shown in FIG. 4, partially overlapping, or non-overlapping. Moreover, although only two space-based components, two ATCs and two radioterminals are illustrated, larger numbers may be provided according to embodiments of the present invention.

In embodiments of FIG. 4, a first space-based component 410a is configured to communicate uni-directionally and/or bidirectionally with a first radioterminal 420a transmitting over a first forward link 440a using a first band of frequencies F1 and/or receiving over a first return link 450a using a second band of frequencies F2. A second space-based component 410b is configured to communicate uni-directionally and/or bidirectionally with a second radioterminal 420b transmitting over a second forward link 440b using a third band of frequencies F3 and/or receiving over a second return link 450b using a fourth band of frequencies F4. More particularly, the first band of frequencies F1 and the third band of frequencies F3 may comprise different frequency bands so that the first and second space-based components 410a and 410b do not transmit over the same frequency bands.

The first space-based component 410a may also be configured to receive return link communications from the second radioterminal 420b over the second return link 450b using the fourth band of frequencies F4. Similarly, the second space based component 410b may be configured to receive return link communications from the first radioterminal 420a over the first return link 450a using the second band of frequencies F2. In addition, a return link diversity combiner 160 may be configured to combine return link communications received from the first radioterminal 420a at the first space-based component 410a and at the second space-based component 410b, and to combine return link communications received from the second radioterminal 420b at the first space-based component 410a and at the second space-based component 410b.

Return link diversity combining may allow greater link margins to be provided in the return links, thereby allowing reduced power, weight, radiation, and/or other demands on the radioterminals 420. It will be understood by those having skill in the art that the return link diversity combiner 160 may be associated with a first satellite gateway 162a that is associated with the first space-based component 410a, may be associated with a second satellite gateway 162b that is associated with the second space-based component 410b, and/or may be at least partially separate from either gateway. Moreover, portions of the return link diversity combiner 160 may be distributed among different elements of embodiments illustrated in FIG. 4.

In some embodiments of the present invention, the band-sensitive (i.e., frequency sensitive) components of the space-based components 410a and 410b, such as the antenna feed network, the low noise amplifiers, etc., for the return links may be designed to be broadband, so that the operational range of the space-based component return links can extend over a plurality of return link bands, such as L-band, S-band, etc. In other embodiments, separate components for each band may be provided. In still other embodiments, some common broadband components and some narrowband components may be provided. Narrowband components may be used for the forward link to potentially reduce overhead as was described above.

According to particular embodiments of the present invention illustrated in FIG. 4, the first band of frequencies F1 and the third band of frequencies F3 may be different bands of frequencies such that the first space-based component 410a and the second space-based component 410b do not transmit using the same frequencies. Moreover, the second band of frequencies F2 and the fourth band of frequencies F4 may be different bands of frequencies. More particularly, the first band of frequencies F1 and the second band of frequencies F2 may comprise frequencies of substantially a same frequency band, and the third band of frequencies F3 and the fourth band of frequencies F4 may comprise frequencies of substantially a same frequency band.

For example, satellite frequency bands may include an L frequency band (at approximately 1 GHz to 2 GHz), an S frequency band (at approximately 2 GHz to 4 GHz), a C frequency band (at approximately 3.7 GHz to 8 GHz), an X frequency band (at approximately 7.25 GHz to 12 GHz), a Ku frequency band (at approximately 12 GHz to 18 GHz), a Ka frequency band (at approximately 18 GHz to 30.4 GHz), a V frequency band (at approximately 37.5 GHz to 50.2 GHz) and/or any other frequency band. As will be understood by those having skill in the art, each of these frequency bands may provide a large number of different forward and return links.

Generally, the first and second bands of frequencies F1 and F2 for forward and return links between the first space-based component 410a and the first radioterminal 420a may be frequencies of a same frequency band selected from a first of the above listed satellite frequency bands, and the third and fourth bands of frequencies F3 and F4 for forward and return links between the second space-based component 410b and the second radioterminal 420b may be frequencies of a same frequency band selected from the above listed satellite frequency bands. More particularly, uni-directional and/or bidirectional communications between the first space-based component 410a and the first radioterminal 420a may be provided over forward and/or return links 440a and 450a using a satellite S band (i.e., F1=a satellite S band and F2=a satellite S band), and uni-directional and/or bidirectional communications between the second space based component 410b and the second radioterminal 420b may be provided over forward and/or return links 440b and 450b using a satellite L band (i.e., F3=a satellite L band and F4=a satellite L band).

According to alternate embodiments of the present invention illustrated in FIG. 4, the first band of frequencies F1 and the third band of frequencies F3 may be different bands of frequencies, and the second band of frequencies F2 and the fourth band of frequencies F4 may be a common and/or different band of frequencies. In some embodiments, the second and fourth bands of frequencies F2 and F4 may comprise frequencies that are substantially distinct from the first and/or third bands of frequencies F1 and F3. In other embodiments, the second and fourth bands of frequencies F2 and F4 may comprise frequencies that partially overlap the first and/or third bands of frequencies F1 and F3. In still other embodiments, the second and fourth bands of frequencies F2 and F4 may comprise frequencies that are a combination of the first and third bands of frequencies F1 and F3.

As discussed above, satellite frequency bands may include an L frequency band (at approximately 1 GHz to 2 GHz), an S frequency band (at approximately 2 GHz to 4 GHz), a C frequency band (at approximately 3.7 GHz to 8 GHz), an X frequency band (at approximately 7.25 GHz to 12 GHz), a Ku frequency band (at approximately 12 GHz to 18 GHz), a Ka frequency band (at approximately 18 GHz to 30.4 GHz), a V frequency band (at approximately 37.5 GHz to 50.2 GHz) and/or any other frequency band. Generally, the first band of frequencies F1 for forward links from the first space-based component 410a to the first radioterminal 420a may be selected from the above listed satellite frequency bands; the third band of frequencies F3 for forward links from the second space-based component 410b to the second radioterminal 420b may be selected from the above listed satellite frequency bands; and the second and fourth bands of frequencies F2 and F4 may be selected from the above listed satellite frequency bands and/or may be a combination of the first and/or third bands of frequencies. More particularly, forward links 440a from the first space-based component 410a to the first radioterminal 420a may be provided using a satellite S band (i.e., F1=a satellite S band downlink portion); forward links 440b from the second space based component 410b to the second radioterminal 420b may be provided using a satellite L band (i.e., F3=a satellite L band downlink portion); and return links 450a and 450b from the radioterminals 420a and 420b to the respective space-based components 410a and 410b may be provided respectively using uplink portions of the satellite L and/or S bands.

The satellite radioterminal communications system illustrated in FIG. 4 may also include one or more ancillary terrestrial networks (ATNs) including a plurality of ancillary terrestrial components (ATCs), such as ATCs 470a and 470b. For example, the ancillary terrestrial component 470a may be configured to provide uni-directional and/or bidirectional communications with the first radioterminal 420a, and the ancillary terrestrial component 470b may be configured to provide uni-directional and/or bidirectional communications with the second radioterminal 420b. More particularly, the ATC 470a may provide forward links for transmission to the radioterminal 420a using substantially the first band of frequencies (denoted by F1') and return links for reception from the radioterminal 420a using substantially the second band of frequencies (denoted by F2'). Similarly, the ATC 470b may provide forward links for transmission to the radioterminal 420b using substantially the third band of frequencies (denoted by F3') and return links for reception from the radioterminal 420b using substantially the fourth band of frequencies (denoted by F4'). The ATCs 470a and 470b may operate using substantially the same air interfaces as are used by the space-based components 410a and 410b respectively. In other embodiments, the ATCs 470a and 470b may operate using different air interfaces than those used by the respective space-based components 410a and 410b. In some embodiments, ATC 470a and/or 470b is/are configured to communicate with radioterminals 420a and/or 420b using a Time Division Duplex (TDD) mode. It will be understood that although two ATCs are illustrated in FIG. 4, larger numbers of ATCs may be provided according to embodiments of the present invention.

Ancillary terrestrial networks may thus be used together with respective space-based components to provide improved satellite radioterminal communications systems, with space-based component(s) and/or ATC(s) using a same, substantially a same, and/or distinct frequency band(s), sub-bands and/or air interface(s). More particularly, space-based components may provide broad coverage over large areas, and ancillary terrestrial networks may provide increased capacity in densely populated and/or high traffic areas such as cities, industrial/commercial areas, etc. By providing that a space-based component(s) and an ancillary terrestrial network use a same, substantially a same, and/or different frequency band(s), sub-bands and/or air interface(s), a complexity of a radioterminal configured to communicate with both can be reduced.

A radioterminal may thus be configured to preferentially establish communications using an ATC when an ATC is available, and to establish communications using a space-based component when an ATC is not available. In addition, an ATC and a space-based component may be configured to hand-off a uni-directional and/or bidirectional communication (such as a voice and/or data communication) between the mobile terminal and the space-based component to the ATC, for example, when the radioterminal is moved into range of the ATC during a communication initially established with the space-based component. Conversely, an ATC and a space-based component may be configured to hand-off a uni-directional and/or bidirectional communication (such as a voice and/or data communication) between a mobile terminal and an ATC to a space-based component, for example, when the radioterminal is moved out of range of the ATC during a communication initially established with the ATC.

In embodiments of FIG. 4, ATC 470a and/or 470b may use substantially the same frequency bands or substantially different (non-overlapping) frequency bands and/or frequency sub-bands for forward and return links as are used by the respective space-based components 410a and 410b. For example, the ATC 470a may be in an area covered by the space-based component 410a, and the ATC 470b may be in an area covered by the space-based component 410b. Moreover, forward links from the space-based component 410a and the ATC 470a may be provided over respective bands of frequencies F1 and F1' (that may have at least one non-overlapping interval and/or that may be substantially the same); return links to the space-based component 410a and the ATC 470a may be provided over respective bands of frequencies F2 and F2' (that may have at least one non-overlapping interval and/or that may be substantially the same); forward links from the space-based component 410b and the ATC 470b may be provided over respective frequency bands F3 and F3' (that may have at least one non-overlapping interval and/or that may be substantially the same); and return links to the space-based component 410*b* and the ATC 470*b* may be provided over respective bands of frequencies F4 and F4' (that may have at least one non-overlapping interval and/or that may be substantially the same). In some embodiments of FIG. 4 discussed above, the first and second bands of frequencies may be a same and/or portions of a same frequency band and the third and fourth bands of frequencies may be a same and/or portions of a same frequency band. In other embodiments of FIG. 4 discussed above, the first and third bands of frequencies may be different and the second and fourth bands of frequencies may each be a combination of the first and third bands of frequencies.

In still other embodiments of FIG. 4, the first and third bands of frequencies F1 and F3 used for different space-based component forward links may be different, and the second and fourth bands of frequencies F2 and F4 used for different space-based component return links may each be a combination of at least portions of the first and third bands of frequencies and/or at least portions of the satellite frequency bands associated with the first and/or third bands of frequencies. In some embodiments, the allocation of the bands of frequencies for forward and return links for an ATC may be reversed in providing a communications direction with respect to the allocations of the bands of frequencies for the space-based components. In some embodiments, the allocation of the bands of frequencies for forward and return links for an ATC may be overlapping at least partially or non-overlapping with the allocations of the bands of frequencies for the space-based components and/or at least some portions thereof may be used in providing communications in forward and return directions (TDD mode). By way of example, the forward/return link arrows between the ATC 470*b* and the radioterminal 420*b* may be reversed with respect to what is shown in FIG. 4 so that forward links are provided by the ATC 470*b* using the band of frequencies F4' and so that return links are provided by the ATC 470*b* using the band of frequencies F3'. A greater flexibility and/or choice may thus be available for transmission for ATCs such as ATC 470*b*. Such an allocation of frequencies may facilitate diversity reception using space-based components 410*a* and 410*b* while providing a relatively large bandwidth for forward link transmission from an ATC to a radioterminal. A relatively large bandwidth for transmission to the radioterminal may be desirable, for example, in communications (such as internet browsing) where a relatively brief request from the radioterminal results in a relatively large download (data transfer) from the ATC to the radioterminal.

It will be understood that at least some of the space-based components (satellites) illustrated in FIGS. 1 through 4, may be configured to receive communications from radioterminals using at least two substantially orthogonal polarizations and that a return link diversity combiner may be configured to combine communications received by one or more space-based components from a radioterminal over the at least two substantially orthogonal polarizations to thereby improve a return link performance measure such as a return link margin. It will also be understood that a return link diversity combiner may be configured to combine signals of substantially the same and/or orthogonal polarizations received by one or more space-based components.

In some embodiments of the invention, one or more space-based components may be configured to transmit communications to a radioterminal using at least two substantially orthogonally-polarized antennas (or antenna elements), differently-polarized antennas (or antenna elements) and/or spatially-separated antennas (or antenna elements) and the radioterminal may be configured to process at least some of the communications that is transmitted by the one or more space-based components using the at least two substantially orthogonally-polarized antennas (or antenna elements), differently-polarized antennas (or antenna elements) and/or spatially-separated antennas (or antenna elements) that are received at the radioterminal to thereby improve a communications performance measure of a forward link.

In some embodiments, the space-based network and/or the ancillary terrestrial network may establish communications with radioterminals using substantially the same or different air interface protocols and/or the space-based network and/or the ancillary terrestrial network may be configured to establish communications with a first and second radioterminal using respective first and second air interface protocols that are substantially the same or different. In further embodiments, the space-based network and/or the ancillary terrestrial network may be configured to establish forward link communications with a radioterminal using a forward link air interface protocol that is substantially the same or different compared to a return link air interface protocol that the space-based network and/or the ancillary terrestrial network uses to establish return link communications with the radioterminal. In some embodiments, a forward link channel bandwidth may be different from a return link channel bandwidth.

It will also be understood that any ATC that is illustrated in FIGS. 1 through 4, may be configured to communicate with any of the illustrated radioterminals (and/or any of the radioterminals illustrated in FIGS. 1 through 4 may be configured to communicate with any of the illustrated ATCs) in a Frequency Division Duplex (FDD) and/or in a Time Division Duplex (TDD) mode using any portion of and/or any combination of the illustrated first, second, third and/or fourth bands of frequencies and/or any other band of frequencies, and that any ATC may be configured to receive communications from a radioterminal using at least two substantially orthogonally-polarized antennas (and/or antenna elements), differently-polarized antennas (and/or antenna elements) and/or spatially-separated antennas (and/or antenna elements), and may further be configured to process and/or combine at least some of the communications received from the radioterminal over the at least two substantially orthogonally-polarized antennas (and/or antenna elements), differently-polarized antennas (and/or antenna elements) and/or spatially-separated antennas (and/or antenna elements) at one or more ATCs to thereby improve at least one return link performance measure. In some embodiments, the one or more ATCs are adjacent ATCs.

In some embodiments, the space-based network and/or the ancillary terrestrial network may each be configured to establish communications with two or more classes of radioterminals each using two or more respective classes of air interface protocols that are substantially the same or different. The space-based network may be configured to establish communications with the two or more classes of radioterminals using two or more respective air interface protocols that are substantially the same or different. In further embodiments, the space-based network may be configured to establish forward link communications with a radioterminal using a forward link air interface protocol that is substantially the same or different compared to a return link air interface protocol that the space-based network uses to establish return link communications with the radioterminal. In some embodiments, a forward link channel bandwidth may be different from a return link channel bandwidth. The ancillary terrestrial network may be configured to establish communications with the two or more classes of radioterminals using two or more respective air interface protocols that are substantially the same or different. In further embodiments, the ancillary terrestrial network may be configured to establish forward link communications with a radioterminal using a forward link air interface protocol that is substantially the same or different compared to a return link air interface protocol that the ancillary terrestrial network uses to establish return link communications with the radioterminal. In some embodiments, a forward link channel bandwidth may be different from a return link channel bandwidth.

One or more ancillary terrestrial components of an ancillary terrestrial network may be configured to transmit communications to a radioterminal using at least two substantially orthogonally-polarized antennas (and/or antenna elements), differently-polarized antennas (/and/or antenna elements) and/or spatially-separated antennas (and/or antenna elements) and the radioterminal may be configured to process and/or combine at least some of the communications that are transmitted by the one or more ancillary terrestrial components using the at least two substantially orthogonally-polarized antennas (and/or antenna elements), differently-polarized antennas (and/or antenna elements) and/or spatially-separated antennas (and/or antenna elements) that are received at the radioterminal to thereby improve a communications performance measure of a forward link. In some embodiments, the one or more ancillary terrestrial components are adjacent ancillary terrestrial components.

In some embodiments of the invention, a radioterminal may be operatively configured to establish communications with at least one ancillary terrestrial component of an ancillary terrestrial network, with at least one space-based component of a space-based network and/or with at least one other network, and the at least one ancillary terrestrial component of the ancillary terrestrial network and the radioterminal may be configured to preferentially establish communications thereinbetween to thereby improve at least one measure of communications performance (such as a link margin, a Bit Error Rate (BER), a Frame Erasure Rate (FER), a channel throughput such as a data rate, etc.) relative to a value of the at least one measure of communications performance when the radioterminal is communicating with an alternate network, such as, for example, a space-based network. The ancillary terrestrial network, the space-based network and the at least one other network may be configured to use at least one common network operations and/or radio resource management controller and/or at least two different, independent and/or autonomous network operations and/or radio resource management controllers that may, in some embodiments, be operatively connected.

In some embodiments of the invention, a radioterminal may be configured to radiate a higher power level when communicating with the space-based network relative to a power level that the radioterminal is configured to radiate when communicating with the ancillary terrestrial network and the higher power level, in some embodiments, may be a maximum power level and/or a maximum Equivalent Isotropic Radiated Power (EIRP) level that may be provided to the radioterminal by a satellite-mode power amplifier and/or a satellite-mode antenna. The satellite-mode power amplifier and/or the satellite-mode antenna may be configured internally and/or externally to the radioterminal and/or may be operatively connected to the radioterminal via physical and/or wireless means.

Accordingly, at least one measure of system performance and/or at least one measure of user satisfaction may be improved. The system may thereby comprise, in accordance with at least one disclosed embodiment, a variation of a disclosed embodiment that will occur to one skilled in the art and/or a combination and/or a variation of the plurality of embodiments disclosed in this specification, an ancillary terrestrial network and/or at least two satellites which use a common band of return link frequencies to communicate with radioterminals, to thereby allow return link diversity processing and potentially improve one or more return link performance measure(s), such as a return link signal margin, while using separate sets of forward link frequencies to communicate with radioterminals, so that a single band of forward link frequencies may be transmitted by a given satellite, to thereby allow reduced complexity, weight, size, power dissipation, cost and/or system development time while potentially improving a service reliability and/or service life.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A satellite radioterminal communications system comprising:
   a first space-based component that is configured to communicate with a first radioterminal over a first forward link using a first band of frequencies and over a first return link using a second band of frequencies;
   a second space-based component that is configured to communicate with a second radioterminal over a second forward link using a third band of frequencies and over a second return link using a fourth band of frequencies and to receive return link communications from the first radioterminal over the second band of frequencies; and
   a combiner that is configured to combine return link communications received from the first radioterminal at the first and second space-based components;
   wherein the first space-based component is configured to exclude communications using the third band of frequencies and wherein the second space-based component is configured to exclude communications using the first band of frequencies;
   wherein the first band of frequencies comprises a first one of an S frequency band or an L frequency band and excludes a second one of the S frequency band or the L frequency band, wherein the third band of frequencies comprises the second one of the S frequency band or the L frequency band and excludes the first one of the S frequency band or the L frequency band wherein the first space-based component is configured to exclude transmission using the third band of frequencies and wherein the second space-based component is configured to exclude transmission using the first band of frequencies.

2. A satellite radioterminal communications system according to claim 1 wherein the first space-based component is further configured to receive return link communications from the second radioterminal over the fourth band of frequencies, and wherein a combiner is configured to combine return link communications that are received from the second radioterminal at the first and second space-based components.

3. A satellite radioterminal communications system according to claim 1 wherein the second band of frequencies comprises at least some frequencies that are substantially non-overlapping with the fourth band of frequencies.

4. A satellite radioterminal communications system according to claim 1 wherein the first and second bands of frequencies comprise respective sets of substantially non-overlapping frequencies and wherein the third and fourth bands of frequencies comprise respective sets of substantially non-overlapping frequencies.

5. A satellite radioterminal communications system according to claim 1 wherein the second and fourth bands of frequencies comprise respective sets of substantially non-overlapping frequencies of a common frequency band and/or of at least two different frequency bands.

6. A satellite radioterminal communications system according to claim 5 wherein the combination of the second and fourth bands of frequencies comprises a frequency band whose frequencies are substantially non-overlapping with the first and/or third band of frequencies.

7. A satellite radioterminal communications system according to claim 5 wherein the combination of the second and fourth bands of frequencies comprises a frequency band whose frequencies at least partially overlap with the first and/or third bands of frequencies.

8. A satellite radioterminal communications system according to claim 1 wherein the first and/or second space-based component is further configured to receive communications from the first and/or second radioterminal using at least two substantially orthogonal polarizations and wherein the combiner is configured to combine signals received by the first and/or second space-based component from the first and/or second radioterminal using the at least two substantially orthogonal polarizations.

9. A satellite radioterminal communications system according to claim 1 further comprising:
at least one ancillary terrestrial network comprising at least one ancillary terrestrial component that is configured to communicate with the first and/or second radioterminal over substantially the first, second, third and/or fourth band of frequencies and/or over at least one more band of frequencies that is not substantially included in the first, second, third and/or fourth band of frequencies.

10. A satellite radioterminal communications system according to claim 9 wherein the at least one ancillary terrestrial component is further configured to receive communications from the first and/or second radioterminal over at least two substantially orthogonal polarizations and/or over at least two antennas that are spaced apart and/or have different spatial orientations.

11. A satellite radioterminal communications system according to claim 9 wherein the at least one ancillary terrestrial network and the first and/or second space-based component is/are further configured to hand-off communications between the first and/or second radioterminal(s) and the first and/or second space-based component(s) to the at least one ancillary terrestrial network.

12. A satellite radioterminal communications system according to claim 11 wherein the communications comprise voice and/or data communications.

13. A satellite radioterminal communications system according to claim 1 wherein the first, second, third, and/or fourth band of frequencies is selected from an L frequency band, an S frequency band, a C frequency band, an X frequency band, a Ku frequency band, a Ka frequency band and/or a V frequency band.

14. A satellite radioterminal communications system according to claim 1 wherein the first and third band of frequencies comprise respective sets of substantially non-overlapping frequencies, the satellite radioterminal communications system further comprising:
at least one ancillary terrestrial component that is configured to communicate with the first and/or second radioterminal(s) using a combination of the first and third bands of frequencies and/or at least one other frequency that is not substantially included in the first and/or third bands of frequencies.

15. A satellite radioterminal communications system according to claim 1 wherein the first, second, third and/or fourth bands of frequencies comprise respective sets of substantially non-overlapping frequencies, the satellite radioterminal communications system further comprising:
at least one ancillary terrestrial component that is configured to communicate with the first and/or second radioterminal(s) over at least one forward link using a combination of the first, second, third and/or fourth bands of frequencies and/or at least one other frequency that is not substantially contained in the first, second, third and/or fourth bands of frequencies and over at least one return link using a combination of the first, second, third and/or fourth bands of frequencies and/or at least one other frequency that is not substantially contained in the first, second, third and/or fourth band of frequencies.

16. A satellite radioterminal communications system according to claim 1 wherein the first and third bands of frequencies are non-overlapping so that substantially all frequencies of one of the first or third bands of frequencies are lower than substantially all frequencies of the other of the first or third bands of frequencies.

17. A satellite radioterminal communications system according to claim 1 wherein the first space-based component is configured to communicate with a third radioterminal over a third forward link using the first band of frequencies.

18. A satellite radioterminal communications system according to claim 1 wherein the first space-based component is configured to communicate with a third radioterminal over a third return link using the second band of frequencies.

19. A method of operating a satellite radioterminal communications system, the method comprising:
providing communications between a first space-based component and a first radioterminal over a first forward link using a first band of frequencies and over a first return link using a second band of frequencies;
providing communications between a second space-based component and a second radioterminal over a second forward link using a third band of frequencies and over a second return link using a fourth band of frequencies;
receiving return link communications at the second space-based component from the first radioterminal over the second band of frequencies; and
combining return link communications received from the first radioterminal at the first and second space-based components;
wherein the first space-based component is configured to exclude transmission using the third band of frequencies and wherein the second space-based component is configured to exclude transmission using the first band of frequencies;
wherein the first band of frequencies comprises a first one of an S frequency band or an L frequency band and excludes a second one of the S frequency band or the L frequency band, wherein the third band of frequencies comprises the second one of the S frequency band or the L frequency band and excludes the first one of the S frequency band or the L frequency band, and wherein the first space-based component is configured to exclude transmission using the third band of frequencies and wherein the second space-based component is configured to exclude transmission using the first band of frequencies.

20. A method according to claim 19 further comprising:
receiving return link communications at the first space-based component from the second radioterminal over the fourth band of frequencies; and combining return link communications that are received from the second radioterminal at the first and second space-based components.

21. A method according to claim 19 wherein the second band of frequencies comprises at least some frequencies that do not substantially overlap with the fourth band of frequencies.

22. A method according to claim 19 wherein the first and second bands of frequencies comprise respective sets of substantially non-overlapping frequencies and wherein the third and fourth bands of frequencies comprise respective sets of substantially non-overlapping frequencies.

23. A method according to claim 19 wherein the second and fourth bands of frequencies comprise respective sets of substantially non-overlapping frequencies of a common frequency band and/or of at least two different frequency bands.

24. A method according to claim 23 wherein the combination of the second and fourth band of frequencies comprises a frequency band whose frequencies are substantially non-overlapping with the first and/or third band of frequencies.

25. A method according to claim 23 wherein the combination of the second and fourth bands of frequencies comprises a frequency band whose frequencies at least partially overlap with the first and/or third bands of frequencies.

26. A method according to claim 19 wherein the first and/or second space-based component is further configured to receive communications from the first and/or second radioterminal using at least two substantially orthogonal polarizations and wherein combining comprises combining signals received by the first and/or second space-based component from the first and/or second radioterminal using the at least two substantially orthogonal polarizations.

27. A method according to claim 19 further comprising:
providing communications between at least one ancillary terrestrial network comprising at least one ancillary terrestrial component and the first and/or second radioterminal over substantially the first, second, third and/or fourth bands of frequencies and/or over at least one more band of frequencies that is not substantially included in the first, second, third and/or fourth bands of frequencies.

28. A method according to claim 27 further comprising:
providing communications between the at least one ancillary terrestrial component and the first and/or second radioterminal over at least two substantially orthogonal polarizations and/or over at least two antennas that are spaced apart and/or have different spatial orientations.

29. A method according to claim 27 further comprising:
handing-off communications between the first and/or second radioterminal and the first and/or second space-based component to the at least one ancillary terrestrial network.

30. A method according to claim 29 wherein the communications comprises voice and/or data communications.

31. A method according to claim 19 wherein the first, second, third and/or fourth bands of frequencies is selected from an L frequency band, an S frequency band, a C frequency band, an X frequency band, a Ku frequency band, a Ka frequency band and/or a V frequency band.

32. A method according to claim 19 wherein the first and third bands of frequencies comprise respective sets of substantially non-overlapping frequencies, the method further comprising:
providing communications between the first and/or second radioterminal and an ancillary terrestrial component using a combination of the first and third bands of frequencies and/or at least one other frequency that is not substantially contained in the first and/or third bands of frequencies.

33. A method according to claim 19 wherein the first, second, third and/or fourth bands of frequencies comprise respective sets of substantially non-overlapping frequencies, the method further comprising:
providing communications between the first and/or second radioterminal and an ancillary terrestrial component over at least one forward link using a combination of the first, second, third and/or fourth bands of frequencies and/or at least one other frequency that is not substantially contained in the first, second, third and/or fourth bands of frequencies and over at least one return link using a combination of the first, second, third and/or fourth bands of frequencies and/or at least one other frequency that is not substantially contained in the first, second, third and/or fourth bands of frequencies.

34. A method according to claim 19 wherein the first and third bands of frequencies are non-overlapping so that substantially all frequencies of one of the first or third bands are lower than substantially all frequencies of the other of the first or third bands.

35. A method according to claim 19 further comprising:
providing communications from the first space-based component to a third radioterminal over a third forward link using the first band of frequencies.

36. A method according to claim 19 further comprising:
providing communications from a third radioterminal to the first space-based component over a third return link using the second band of frequencies.

37. A method according to claim 19 wherein the first space-based component is configured to always exclude transmission using the third band of frequencies and wherein the second space-based component is configured to always exclude transmission using the first band of frequencies.

38. A method according to claim 37 wherein the first and third bands of frequencies comprise different non-overlapping frequency bands.

39. A method according to claim 19 wherein combining return link communications comprises diversity combining return link communications.

40. A method according to claim 19 wherein the first and third bands of frequencies comprise different non-overlapping frequency bands.

41. A satellite radioterminal communications system comprising:
a first space-based component that is configured to communicate with a first radioterminal over a first forward link using a first band of frequencies and over a first return link using a second band of frequencies;
a second space-based component that is configured to communicate with a second radioterminal over a second forward link using a third band of frequencies and over a second return link using a fourth band of frequencies and to receive return link communications from the first radioterminal over the second band of frequencies; and
a combiner that is configured to combine return link communications received from the first radioterminal at the first and second space-based components;
wherein the first space-based component is configured to exclude transmission over the third band of frequencies and wherein the second space-based component is configured to exclude transmission over the first band of frequencies;
wherein the first band of frequencies comprises a portion of one of an L frequency band, an S frequency band, a C frequency band, an X frequency band, a Ku frequency band, a Ka frequency band, or a V frequency band, wherein the first band of frequencies excludes a second one of the L frequency band, the S frequency band, the C frequency band, the X frequency band, the Ku frequency band, the Ka frequency band, or the V frequency band, wherein the second band of frequencies comprises the second one of the L frequency band, the S frequency band, the C frequency band, the X frequency band, the Ku frequency band, the Ka frequency band, or the V frequency band, wherein the second band of frequencies excludes the first one of the L frequency band, the S frequency band, the C frequency band, the X frequency band, the Ku frequency band, the Ka frequency band, or the V frequency band, wherein the first space-based component is configured to exclude transmission over the third band of frequencies and wherein the second space-based component is configured to exclude transmission over the first band of frequencies.

42. A satellite radioterminal communications system according to claim 41 wherein the first and third bands of frequencies comprise non-overlapping bands of frequencies.

43. A method of operating a satellite radioterminal communications system, the method comprising:
providing communications between a first space-based component and a first radioterminal over a first forward link using a first band of frequencies and over a first return link using a second band of frequencies;
providing communications between a second space-based component and a second radioterminal over a second forward link using a third band of frequencies and over a second return link using a fourth band of frequencies;
receiving return link communications at the second space-based component from the first radioterminal over the second band of frequencies; and
combining return link communications received from the first radioterminal at the first and second space-based components;
wherein the first space-based component is configured to exclude transmission over the third band of frequencies and wherein the second space-based component is configured to exclude transmission over the first band of frequencies;
wherein the first band of frequencies comprises a portion of a first one of an L frequency band, an S frequency band, a C frequency band, an X frequency band, a Ku frequency band, a Ka frequency band, or a V frequency band, wherein the first band of frequencies excludes a second one of the L frequency band, the S frequency band, the C frequency band, the X frequency band, the Ku frequency band, the Ka frequency band, or the V frequency band, wherein the second band of frequencies comprises a portion of the second one of the L frequency band, the S frequency band, the C frequency band, the X frequency band, the Ku frequency band, the Ka frequency band, or the V frequency band, wherein the second band of frequencies excludes the first one of the L frequency band, the S frequency band, the C frequency band, the X frequency band, the Ku frequency band, the Ka frequency band, or the V frequency band, and wherein the first space-based component is configured to exclude transmission over the third band of frequencies and wherein the second space-based component is configured to exclude transmission over the first band of frequencies.

44. A method according to claim 43 wherein the first and third bands of frequencies comprise non-overlapping bands of frequencies.

* * * * *